Figure 1:
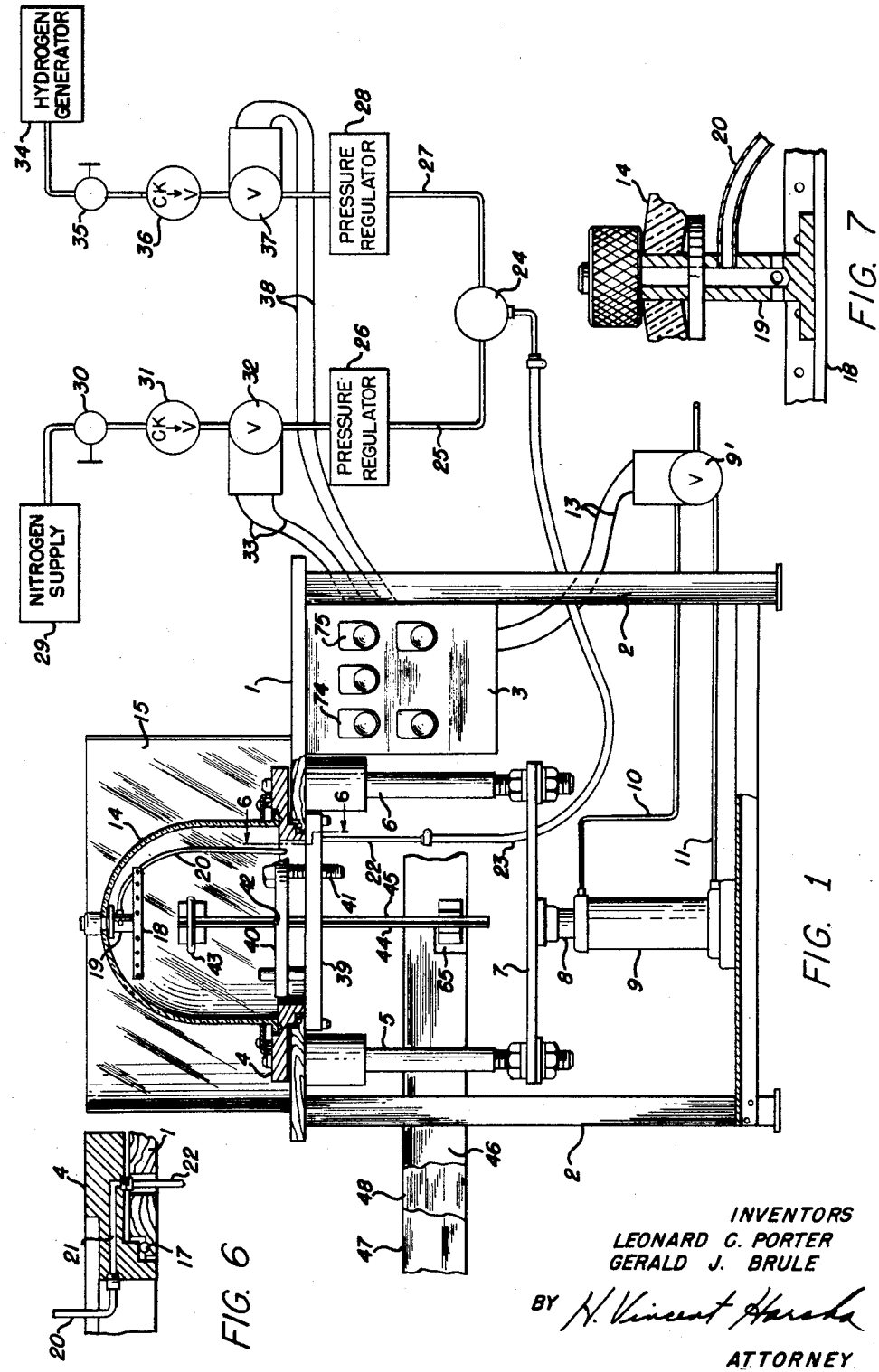

Nov. 24, 1959 L. C. PORTER ET AL 2,914,642
INDUCTION HEATING APPARATUS
Filed Jan. 28, 1959 3 Sheets-Sheet 2

INVENTORS
LEONARD C. PORTER
GERALD J. BRULE
BY H. Vincent Harsha
ATTORNEY

INVENTORS
LEONARD C. PORTER
GERALD J. BRULE

BY *N. Vincent Harsha*

ATTORNEY

United States Patent Office 2,914,642
Patented Nov. 24, 1959

2,914,642

INDUCTION HEATING APPARATUS

Leonard C. Porter, Tewksbury, and Gerald J. Brule, Northboro, Mass., assignors to Raytheon Company, a corporation of Delaware Application January 28, 1959, Serial No. 789,599

5 Claims. (Cl. 219—9.5)

This invention relates generally to induction heating and, more particularly, pertains to apparatus having a controlled atmosphere permitting assemblies to be soldered or brazed by induction heating with all steps, other than placing the assembly to be joined in a fixture and the removal of the bonded assembly, being performed automatically under the control of a timing mechanism.

In induction heating apparatus now commonly used for soldering and brazing, a gas such as hydrogen is employed to envelop the work while it is heated for the purpose of reducing the oxides on the faces of the surfaces being joined to promote an effective union. Where oxygen and hydrogen are commingled, an ever present danger exists that the two gases may mix in such proportions as to form an explosive mixture which may be touched off when the work is heated by induction. In addition, it is a commonly accepted premise that the radio frequency generator which supplies the power to the induction heating coil should not be separated from the coil by a distance of more than four feet in order to prevent excessive power transmission loss.

The invention pertains to induction heating apparatus in which the probability of an explosion occurring is reduced to a minimum by insuring that, if a combustible mixture is formed, it is not explosive and that the mixture is pushed down below the area where heat is generated. The apparatus also permits a plurality of induction heating stations to be serviced by a single R.F. generator, the stations being spaced along a transmission line which may be considerably more than four feet in length.

The invention utilizes a bell jar to form a chamber which is open at its lower end, the bell jar being supported on a movable platform elevated and lowered by a pneumatic piston, the raising of the platform being automatically controlled by an electro-mechanical timer. Within the bell jar is provided a tube through which various gases such as nitrogen and hydrogen may be introduced at the top of the chamber, and a diffuser plate in the chamber substantially prevents the turbulence which would normally occur upon influx of the gases. The sequence and the duration of flow of the gases is automatically controlled by the timer. An induction coil and support for the work are disposed in an area above that in which a flammable mixture of gases is situated and the proportion of gases in the mixture is such that, while the mixture will burn, it will not do so with explosive force. The lower end of the bell jar is at all times open to the atmosphere, but air is prevented from entering the chamber by gases which are present therein. A novel pneumatically operated timer-controlled switch has been devised which couples R.F. (radio-frequency) energy from a transmission system to the induction coil and the duration of the induction heating period is controlled by another timer controlled switch which activates and deactivates an oscillator located in the R.F. generator. A plurality of induction heating stations may be supplied from one A.F. generator by means of the transmission line. By virtue of the transmission line, R.F. energy can be coupled to stations which are located at appreciable distances from the generator without incurring excessive power loss.

Figure 2:
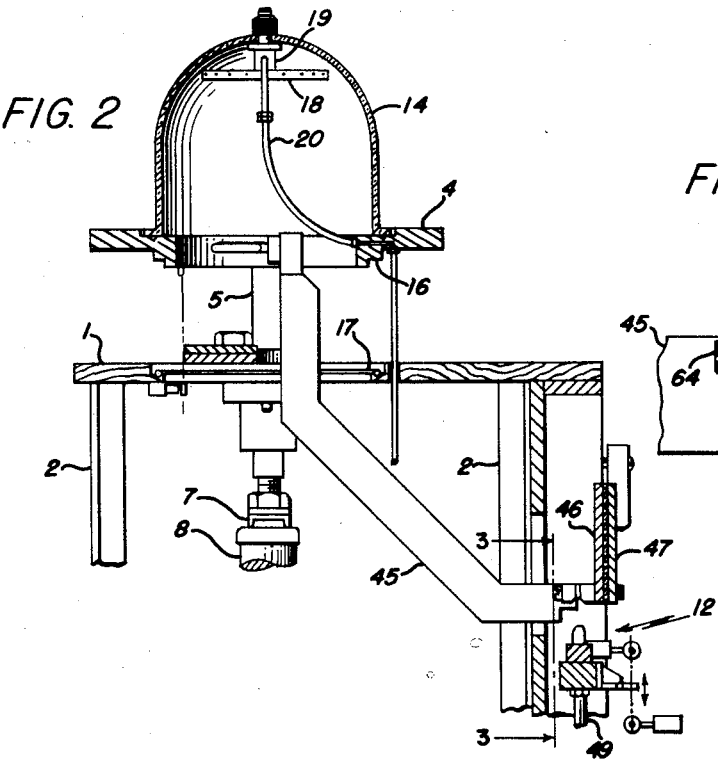
Figure 4:
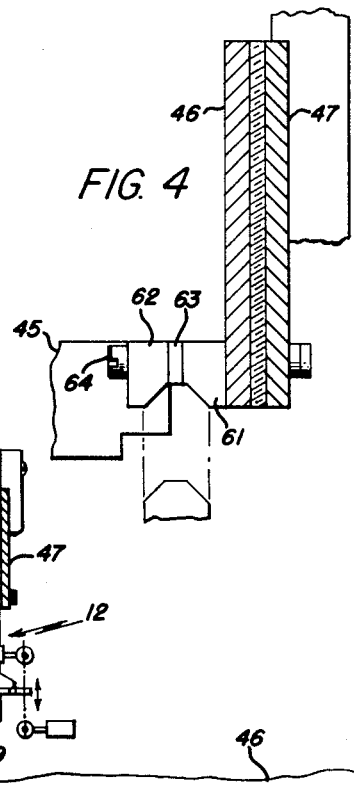
Figure 3:
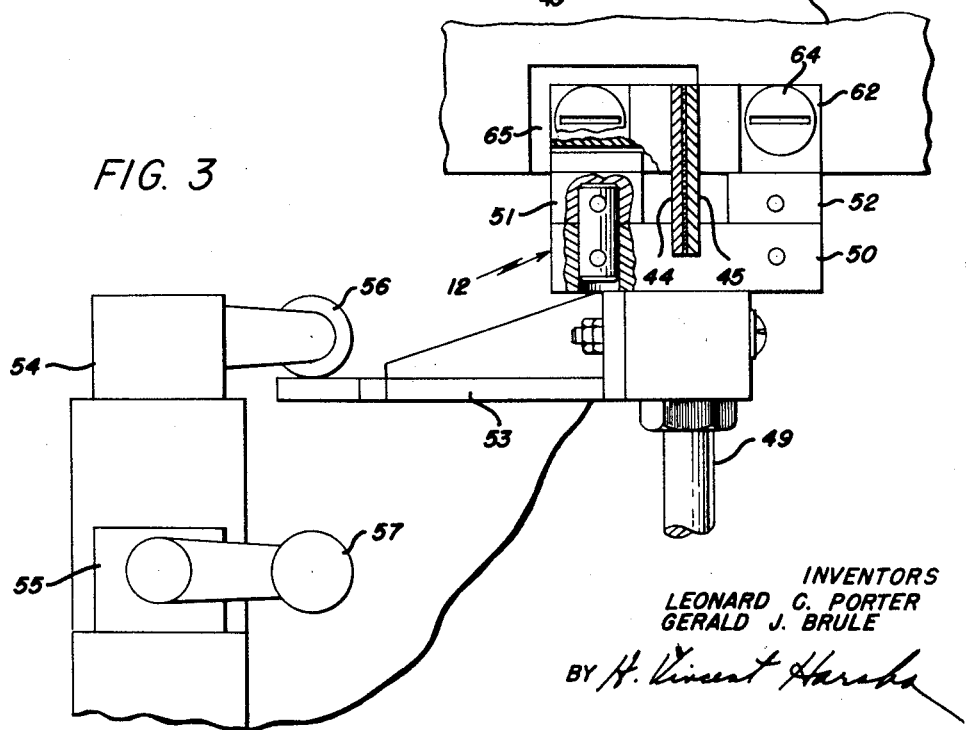
Figure 5:
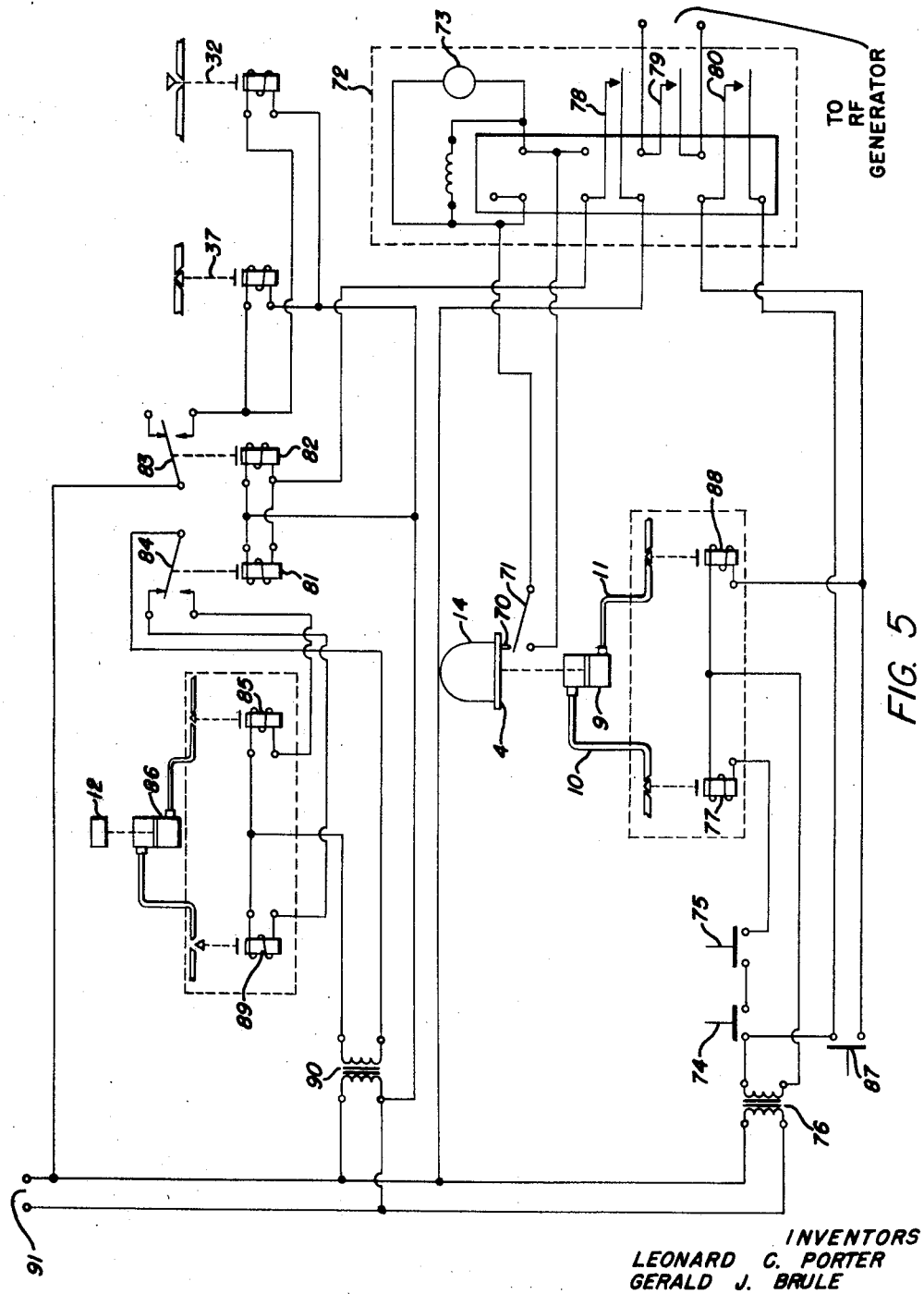

The invention, together with its organization, construction, and mode of operation, will be better understood by a perusal of the following description when considered in conjunction with the drawings wherein:

Fig. 1 illustrates the general arrangement of a preferred embodiment of the invention, Fig. 2 is a sectional elevational view showing the bell jar in its raised position, Fig. 3 is a view of a novel transmission line switch, Fig. 4 depicts constructional details of the transmission line switch, Fig. 5 is a schematic diagram of the electrical circuitry and valving arrangement employed in the invention, and Figs. 6 and 7 are sectional views illustrating details of the apparatus of Fig. 1.

Referring now to Fig. 1, there is shown a table top 1 supported on legs 2 and a control panel 3 secured beneath the table top. A platform 4 is mounted on a pair of rods 5, 6, connected together at their lower ends by a strap 7, the strap being fastened to a piston 8 of a pneumatic cylinder 9 disposed under the table top. Actuation of piston 8 is controlled by a valve 9' which permits compressed air to be directed into one of the tubes 10, 11 to cause the piston to be moved up or down. The valve 9' incorporates an electrical control mechanism, such valves being well-known and readily procurable commercially, that mechanism being responsive to electrical signals originating in the control panel and impressed through conductors 13. The rods 5 and 6 project through apertures in the table top 1. Mounted on the platform 4 is a bell jar 14 which is open at the bottom, the platform having a circular opening which permits access to the chamber of the bell jar when the platform is in its raised position shown in Fig. 2. A safety shield 15 is secured to the platform 4 in front of the bell jar, the safety shield being constituted by a transparent shatterproof material, preferably a plastic. Table top 1 has a circular opening which accommodates a circular flange 16 on the platform, the flange seating upon an O-ring seal 17 (Fig. 2) when the platform is in its lowered position, depicted in Fig. 1. Upon actuation of the piston 8, the platform 4 is raised, carrying with it the bell jar and safety shield. A perforated diffuser plate 18 is secured to the top of the bell jar by a stem 19, the stem having transverse ports which communicate with an interior vertical passage. A tube 20 is disposed within the bell jar, one end of the tube being fastened to the stem 19 and the lower end of the tube being secured to platform 4 and connecting into a passage (Fig. 6) 21 drilled in the platform, the passage having another tube 22 connecting into it. Tube 22 projects downwardly through a hole in the table top 1 and has its lower end connected into a flexible hose 23. Hose 23 is secured to a flow meter 24, that meter in turn being connected through pipe 25 to a pressure regulator 26 and through pipe 27 to a pressure regulator 28. A source of nitrogen 29 is connected through a manual shut off valve 30, a check valve 31, and an electrically controlled valve 32 to the pressure regulator 26. Opening and closing of valve 32 is automatically governed by a timer located in the control panel 3 which transmits electrical signals over conductors 33. In a similar manner a hydrogen generator 34 is connected through a manual shut off valve 35, check valve 36 and an electrically controlled valve 37 to the pressure regulator 28. Opening and closing of valve 37 is also controlled by the timer located in the control panel which transmits electrical signals over conductors 38.

Secured to the table top 1 and extending across the circular aperture therein is a support 39 to which is secured a table 40 which may be adjusted in height by means of the threaded screw 41, the table having a key 42 secured thereto. Both the table 40 and support 39 may have numerous perforations therein so that when the platform is in its lowered position, gases in the bell jar can be pushed out and vented directly into the area below the table. If desired, ducting can be provided to conduct such expelled gases to a convenient location for venting to the atmosphere. The key 42 acts to locate a jig or fixture which holds the work to be soldered or brazed.

An induction heating coil 43, shown in Fig. 1, is suspended above the table 40, the coil being supported upon a pair of buss bars 44 and 45, those bars being separated by an insulator. Buss bars 44 and 45 can be connected to a radio frequency transmission line, constituted by another pair of buss bars 46 and 47 separated by an insulator 48, which line transmits electrical energy having a frequency in the vicinity of four hundred and fifty kilocycles from a radio frequency generator (not shown) to the buss bars 44 and 45 through a pneumatically operated switch 12, that switch being shown in Figs. 2 and 3. The pneumatic switch 12 includes a cylinder, similar to the cylinder 9, and a piston 49, the actuation of that piston being controlled from the timer in control panel 3, in the same manner that piston 8 is controlled, that is, by means of an electrically operated valve controlled by the timer. Secured to the upper end of piston 49 is an insulative block 50 carrying a pair of electrically conductive contacts 51 and 52, the contacts being mounted so that they can wobble slightly. The upper surfaces of the contacts are chamfered, whereby each contact is, in effect, a wedge. Also secured to the piston 49 is a bracket 53. When the piston 49 is raised and lowered, the bracket reciprocates between a pair of limit switches 54 and 55, each of the switches having a lever arm 56, 57, respectively, positioned to intercept the bracket 53. These switches control the limits between which the piston 49 is confined in its movement. Referring to Fig. 4, a pair of electrically conductive blocks 61 and 62 separated by an insulator 63 are fastened by an insulative screw 64 to the transmission line so that the block 61 is in intimate contact with the buss 46 but the block 62 is insulated therefrom. The buss 46 has a rectangular cut out 65 (Fig. 3), through which a similar assembly of conductive blocks separated by an insulator is fastened to the buss 47. The block 62 is brazed or otherwise secured to buss 45 and the corresponding block of the other assembly is fastened to the buss 44. When the piston 49 moves upwardly, the contacts 51 and 52 are driven between the blocks, thereby electrically connecting buss 45 to buss 46 and electrically connecting buss 44 to buss 47. Hence, when the switch is closed, radio frequency power can be transmitted to the induction heating coil 43, but when the switch is open the transmission line 46, 47 is disconnected from the transmission link 44, 45. The transmission lines are preferably constructed of copper having a silver plate thereon, all sharp edges being removed from the lines to prevent radiation of the high frequency energy. It is also undesirable to have any sharp bends in the R.F. transmission system and therefore the busses 44 and 45 are angled upwardly as shown in Fig. 2.

Operation of the system will be explained with reference to Fig. 5 which diagrammatically illustrates the electrical circuitry and the arrangement of valves employed in the previously described structure. The bell jar 14 is shown mounted on platform 4, that platform being raised and lowered by the pneumatic cylinder 9. Protruding from under the platform 4 is a pin 70 which closes switch 71 when the platform is seated on table top 1. The timer, situated in control panel 3, is represented by the apparatus within the block 72 and includes an electric motor 73 for driving a shaft to cause the switches in the timer to open and close in a desired sequence. Such timing mechanisms are well known and no detailed description of that mechanism is given here. The switches of the timer can be adjusted so that there is a delay between the opening of one switch and the closing of another switch or the operation of the switches can be phased to over-lap each other. A source of alternating electrical potential is connected to the terminals 91. The initial state of the apparatus is as follows: the platform 4 is in the raised position; switch 71 is open so that the timer motor 73 is inactive; valve 32 is normally open permitting nitrogen gas to flow into the bell jar, the nitrogen gas being maintained at a pressure slightly above atmospheric to prevent air from entering the bell jar; valve 37 is normally closed so that hydrogen cannot enter the bell jar; switch 83 is in the position shown so that the solenoids associated with valves 32 and 37 are not energized; and switch 84 is in the position depicted whereby the secondary of transformer 90 is connected across the solenoid 89 maintaining its associated valve open so that compressed air is present in the upper portion of cylinder 86 and the transmission line switch 12 is consequently in its lower or open position at which the R.F. transmission line is disconnected from the induction heating coil 43 (Fig. 1). In order for a cycle of operation to be initiated, the operator must depress the switches 74 and 75, thereby connecting the secondary of transformer 76 across the solenoid 77 and causing its associated valve to open permitting compressed air to flow in the line 10 whereby the platform 4 and the bell jar are lowered into the position shown in Fig. 1. It should be noted that switches 74 and 75 are normally held open and as a safety precaution, the switches are arranged so that the operator must use both hands to close those switches. Further, if the operator should take one or both hands off the switches before the platform 4 has reached its lowermost position, the switch or switches will open, causing the valve of solenoid 77 to close and halt the motion of the platform. When the platform reaches its lowermost position, switch 71 is closed by pin 70 causing the motor 73 in the timer 72 to be actuated. The operator now releases switches 74 and 75 as the timer controls the operation of the machine. The switches 78, 79 and 80 in the timer are operated in sequence. The switch 78 after a brief interval in closed causing the solenoids 81 and 82 to be energized and pull down their associated switches. When switch 83 is pulled down, valve 37 opens permitting hydrogen to flow into the bell jar and valve 32 simultaneously closes cutting off the flow of nitrogen. The hydrogen which flows into the jar through the ports in stem 19 (Fig. 1), passes down through the perforations in the diffuser plate pushing the nitrogen downwardly below the area of the induction heating coil 43 and the work to be soldered or brazed. Thus the work is surrounded by an envelope of pure hydrogen while in the lower part of the bell jar there is a mixture of hydrogen and nitrogen which is combustible but not explosive. Upon switch 84 being pulled down, solenoid 85 is energized causing its associated valve to open, thereby permitting compressed air to flow into the lower portion of cylinder 86 which in turn causes transmission line switch 12 to connect the induction heating coil 43 to the transmission line. After a predetermined interval switch 79 in the timer is closed, turning on the radio frequency generator whereby electrical energy is caused to flow to the induction heating coil. During this period switch 78 remains closed so that hydrogen continues to flow into the bell jar while the work is being heated. The length of the induction heating period, of course, depends upon the nature of the work being brazed or soldered and that period may be preset as required by an adjustment for switch 79 which determines the length of time during which that switch remains closed. At the conclusion of the induction heating period switch 79 opens and shortly thereafter switch 78 opens causing the flow of hydrogen to be cut off and the flow of nitrogen into the bell jar to commence. After another preset interval, switch 80 closes causing the solenoid 88 to be energized so that its associated valve opens and permits compressed air to flow into the lower portion of cylinder 9 causing the platform 4 to be raised until switch 71 opens and deenergizes the motor 73. The switch 71 may be fitted with a dashpot or other mechanism which causes the opening of that switch to be delayed for a period long enough to permit the platform 4 to be completely raised. The bell jar and its platform 4 may be raised during any part of the machine's cycle by closing the switch 87 which causes the solenoid 88 to be energized and open its associated valve, permitting compressed air to flow into the lower section of cylinder 9.

The type of R.F. generator commonly used in induction heating apparatus contains a contactor switch which controls the activation of an R.F. oscillator in the generator. The switch 79 in the timer is connected to the contactor switch in the generator so that closing of switch 79 causes the contactor switch to close and turn on the R.F. oscillator and opening of switch 79 causes the contactor switch to open and turn off the oscillator.

The transmission line switch 12 is pneumatically operated in lieu of solenoid type switches because the use of solenoids in the transmission of radio frequency power may result in chattering of the solenoids and arcing at the contact surfaces.

In summary, the sequence of operation is as follows: (1) with the bell jar in the raised position and nitrogen gas present therein, the operator places a part to be soldered or brazed in a standard fixture keyed to the table 40; (2) the operator then closes the switches 74 and 75 energizing the cylinder 9 and causing the bell jar to be lowered; (3) when the bell jar reaches the bottom of its travel, the platform 4 seats on the O-ring seal 17 and pin 70 closes switch 71 thereby energizing the motor 73 of timer 72; (4) the timer then turns off the nitrogen gas, turns on the hydrogen gas for a preset length of time, and closes the R.F. transmission line switch 12; (5) while the hydrogen gas envelops the work to be brazed or soldered, the timer closes the control circuit to the generator, causing R.F. power to flow to the induction heating coil for a predetermined period; (6) upon the expiration of the heating period the timer opens the control circuit to the generator; (7) the timer then opens the R.F. transmission line switch 12, turns off the hydrogen gas and simultaneously turns on the nitrogen gas; (8) after a preset interval the timer causes the bell jar to be raised, at the same time that the bell jar is being purged with nitrogen gas.

It is important to note that the induction heating coil 43 shown in Fig. 1 is positioned at a height substantially above the lower end of the bell jar when that jar is in its lowered position. Thus there is provided in the chamber of the jar a lower area into which the nitrogen gas is pushed when the hydrogen flows down through the diffuser plate 18. The lower layer of nitrogen which is thus formed prevents the ambient air from entering through the open end of the bell jar. Some of the hydrogen, of course, diffuses into the nitrogen, as will some of the air, but the mixture of gases is such that it is scarcely combustible and most certainly not explosive.

The radio frequency transmission line, constituted by buss bars 46 and 47 separated by an insulator 48, can be used to transmit power from a central R.F. generator to a plurality of work stations, each work station being similar to the station depicted in Fig. 1. Each station may be equipped with power controls which allow for stepless control from 0% to 100% of maximum output of the R.F. generator. The power settings at each station may thereby be set independently from the power settings at the other stations. In actual practice, four such stations have been spaced along an R.F. transmission line, the last station being over fourteen feet from the generator. When a plurality of stations are connected to the R.F. transmission line, it is inadvisable to have power flowing to more than one station at the same time, since the R.F. oscillator in the generator may then be too greatly loaded. To prevent simultaneous operation of the stations, switches can be arranged to permit only one station to be connected to the R.F. transmission line at one time.

While the drawings do not illustrate any means for cooling the induction heating coil 43, it is to be understood that in accordance with conventional practice, piping may be provided to circulate a coolant, usually water, through the coil. The R.F. transmission line may also be cooled, if desired, by any conventional means.

The apparatus illustrated in Fig. 1 can be modified for induction heating applications which require a vacuum rather than a hydrogen atmosphere. In addition to the hydrogen generator, there may be substituted a vacuum pump, so that the gases in the bell jar may be withdrawn at the appropriate time. Of course, the opening in table top 1 must be closed off to prevent air from entering the bell jar when the platform 4 is seated on the O ring seal.

The invention is not limited to the particular details of construction illustrated, as modifications which do not depart from the essence of the invention will be apparent to those skilled in the art. It is, therefore, intended that the scope of the invention be delimited by the appended claims.

What is claimed is:

1. Induction heating apparatus comprising an enclosing structure defining a chamber open at its lower end, a platform carrying said structure and having an aperture therein permitting access to said chamber, reciprocal means for raising and lowering said platform, a conduit for introducing a gas into said chamber, a diffuser plate in said chamber for preventing turbulence in the area below said plate due to the influx of said gas, a valve connected in said conduit, valve control means associated with said valve, an induction coil positioned to be in said chamber when said platform is lowered, a switch for connecting a transmission line to said induction coil, a sequential timer, means for actuating said timer upon lowering of said platform, and means connecting said timer to said valve control means and said switch and said reciprocal means whereby said timer governs their sequence of operation.

2. Induction heating apparatus comprising a transmission line for conducting radio frequency power to an induction heating station, said station including an enclosing structure defining a chamber open at its lower end, a platform carrying said structure, said platform having an aperture therein permitting access to said chamber, reciprocal means for raising and lowering said platform, a conduit for introducing a gas into said chamber, a diffuser plate in said chamber for preventing turbulence in the area below said plate due to the influx of said gas, a valve connected in said conduit, valve control means associated with said valve, an induction coil positioned to be in said chamber when said platform is lowered, a switch for connecting said transmission line to said induction coil, a timer, means connecting said timer to said reciprocal means and said valve control means and said switch whereby said timer governs their sequence of operation, and means for actuating said timer.

3. Induction heating apparatus comprising a radio frequency generator, a power transmission line connected to the output of said generator, a plurality of induction heating stations spaced along said transmission line, each of said stations including an enclosing structure defining a chamber open at its lower end, a platform on which said structure is carried, said platform having an aperture permitting access to said chamber, means connected to said platform for raising and lowering said platform, a conduit for introducing a gas into said chamber adjacent the upper end thereof, a diffuser plate in said chamber for minimizing turbulence in the area of said chamber below said plate due to the influx of said gas, a valve having control means associated therewith for controlling its opening and closing, said valve being connected in said conduit, an induction coil positioned in said chamber at height substantially above the lower end of said structure when said platform is lowered, a switch for connecting said transmission line to said induction coil, a sequential timer, means connecting said timer to said radio frequency generator whereby the activation of said generator is controlled by said timer, means connecting said timer to the control means of said valve, means connecting said timer to said switch, and switch means for actuating said timer.

4. Induction heating apparatus comprising a table, a platform, means connected to said platform for raising said platform above said table and lowering said platform thereon, a structure defining a chamber open at its lower end, said structure being disposed by said platform, said platform having an aperture permitting entry into said chamber, a conduit for introducing gases into said chamber adjacent the upper end thereof, a diffuser plate in said chamber below the gas inlet port, a valve connected in said conduit, valve control means associated with said valve for controlling the opening and closing thereof, a timer, means for causing said timer to be actuated when said platform is lowered, a radio frequency generator having a first switch for activating said generator, an induction coil, means mounting said induction coil above said table, said induction coil being disposed in said chamber when said platform is lowered, a transmission line connected to the output of said generator, a second switch for connecting said transmission line to said induction coil, the operation of said first and second switches and said valve control means being governed by said timer.

5. Induction heating apparatus comprising a radio frequency generator having a first switch for activating said generator, a power transmission line connected to the output of said generator, a plurality of induction heating stations spaced along said transmission line, each of said stations including an enclosing structure defining a chamber open at its lower end, a platform on which said structure is carried, said platform having an aperture permitting access to said chamber, means connected to said platform for raising and lowering said platform, a conduit for introducing a gas into said chamber adjacent the upper end thereof, a diffuser plate in said chamber for preventing turbulence in the area of said chamber below said plate due to the influx of said gas, a valve connected in said conduit, valve control means associated with said valve for controlling the opening and closing thereof, an induction coil positioned to be in said chamber and substantially above the lower end of said structure when said platform is lowered, a switch for connecting said transmission line to said induction coil, a timer, means connecting said timer to said first and second switches and to said valve control means whereby the operation of said switches and said valve control means is governed by said timer, and means for actuating said timer.

References Cited in the file of this patent

UNITED STATES PATENTS 2,654,822    Agule _____ Oct. 6, 1953

FOREIGN PATENTS 385,285    Great Britain _____ Mar. 17, 1931